United States Patent [19]

Mühlau

[11] 4,324,139

[45] Apr. 13, 1982

[54] BALANCING DEVICE FOR VEHICLE WHEELS ETC.

[76] Inventor: Karl-Heinz Mühlau, Ludwig-Herr-Strasse 20, D-7880 Bad Säckingen, Fed. Rep. of Germany

[21] Appl. No.: 146,087

[22] Filed: May 2, 1980

[30] Foreign Application Priority Data

May 4, 1979 [DE] Fed. Rep. of Germany ....... 2917993

[51] Int. Cl.³ .............................................. G01M 1/28
[52] U.S. Cl. ..................................................... 73/457
[58] Field of Search ..................... 73/457; 254/1, 8 R, 254/8 B

[56] References Cited

U.S. PATENT DOCUMENTS 3,461,729  8/1969  Haynes .................................... 73/457
3,844,421  10/1974  Nielsen ................................ 254/8 R
3,903,746  9/1975  Goebel .................................... 73/457

FOREIGN PATENT DOCUMENTS 2250432  5/1975  France .................................... 73/457

Primary Examiner—James J. Gill
Attorney, Agent, or Firm—McGlew and Tuttle

[57] ABSTRACT

A balancing device for one wheel of a vehicle is disclosed which comprises a support frame, a pair of support arms pivotally mounted for horizontally and vertically pivoting on the support frame and stress sensing devices connected to the support arms for sensing a stress applied thereto. A driving unit is connected to the support frame and adapted to engage the wheel to be balanced for rotating the wheel. An apparatus for raising the support arms is provided for pivoting the support arms vertically. The support arms include vehicle engagement ends adapted to engage the vehicle and lift the wheel to be balanced.

11 Claims, 2 Drawing Figures

BALANCING DEVICE FOR VEHICLE WHEELS ETC.

FIELD AND BACKGROUND OF THE INVENTION

The invention concerns a balancing device for vehicle wheels and the like, which can be used with particular advantage for balancing motorcycle wheels.

The balancing of unequal distribution of masses is effected, in vehicle wheels, by weights which are secured on the wheel rim. In order to determine the size of these weights and their arrangement, the wheels must be clamped in special balancing machines. But this is very cumbersome, since the wheels must be removed from the wheel axle. Particularly in motor cycles, this requires great energy and time expenditures, since in addition to the wheel fastening, the tachoshaft and other connections must be released. Frequently no suitable lifting device is available for the motorcycles, so that the wheels of a motorcycle are frequently not balanced, even though balancing is advisable.

SUMMARY OF THE INVENTION

The object of the invention is therefore to provide a balancing device for vehicles, and the like which is simple to handle and can be used particularly for balancing the wheels of motorcycles without the wheels having to be detached from the vehicle frame and without the necessity of major preparations. The device should also be portable and compact.

This is achieved according to the invention in that two supporting arms are arranged on a supporting frame to support the wheel to be balanced, these arms being mounted for vertical adjustment and lateral pivotal movement about a vertical axis, and provided directly or over intermediate members with one or more piezo-elements or similar stress measuring means, and that a friction roller is provided for driving the wheel, which can be pressed against the roller and driven by means of a motor.

It is expedient to form the supporting frame of a bottom plate, as well as brackets or crossbeams projecting from the bottom plate, in which the supporting arms are mounted for vertical adjustment and lateral pivotal movements about a vertical axis. The supporting arms can be secured jointly on a carrier shaft mounted in the brackets, which is connected for the vertical adjustment of the supporting arms with an adjusting element, that can be designed as a servo-mechanism actuated by a pressure medium such as a rotating spindle or the like whose control member is connected with an adjusting lever secured on the carrier shaft.

It is furthermore advantageous to keep the supporting arms laterally pivotable in a forked piece arranged on the carrier shaft and to provide for their lateral pivotal movement an adjusting spindle engaging the forked piece, a cable or chain tackle arranged on the forked piece. The supporting arms should be lockable in predetermined angular positions, e.g. by means of bolts engaging the forked pieces.

It is also advisable to provide the supporting arms at their free ends with adjustable bearing boxes rotating about a vertical axis to receive the wheel to be balanced.

The friction roller is preferably arranged in a bracket together with the associated driving motor on a pivotally mounted toggle lever, by means of which the friction roller can be pressed against the wheel to be balanced in the plane of the wheel.

One or both supporting arms can be subdivided for the installation of piezo-elements, but it is also possible to arrange piezo-elements or similar measuring means on one or on both supporting arms, on the servo-mechanism and/or on the adjusting lever of the carrier shaft cooperating with it.

The supporting frame and the supporting arms can be covered with a protective casing.

The balancing device for vehicle wheels according to the invention is not only very simple in its constructional design and thus also economical to manufacture, it is also very easy to handle. If two supporting arms are arranged on a supporting frame for vertical adjustment and lateral pivotal movements, and a friction roller to be pressed against the wheel to be balanced is provided, it is possible to determine the imbalances in a simple manner by means of piezo-elements or other stress measuring means, which are arranged directly on the supporting arms or connected with them by means of intermediate members. It is only necessary to want the wheel to be balanced in the supporting arms equipped with bearing points, lift the supporting arms and drive the wheel. Disassembly of the wheel is thus not necessary, the imbalance can rather be determined immediately and be eliminated without additional energy expenditure. And since the device is portable it can be used practically anywhere for many purposes.

Other details of the balancing device for vehicle wheels, designed according to the invention, can be seen from the embodiment represented in the drawing, which is described more fully below.

DESCRIPTION OF THE PREFERRED EMBODIMENT

Figure 1:
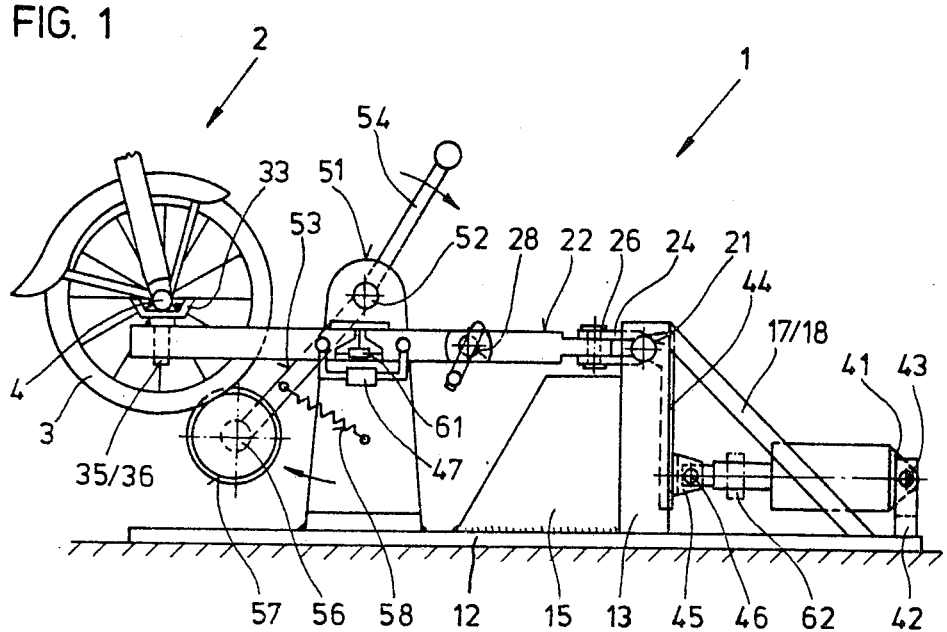
FIG. 1 shows the balancing device in a front view.
Figure 2:
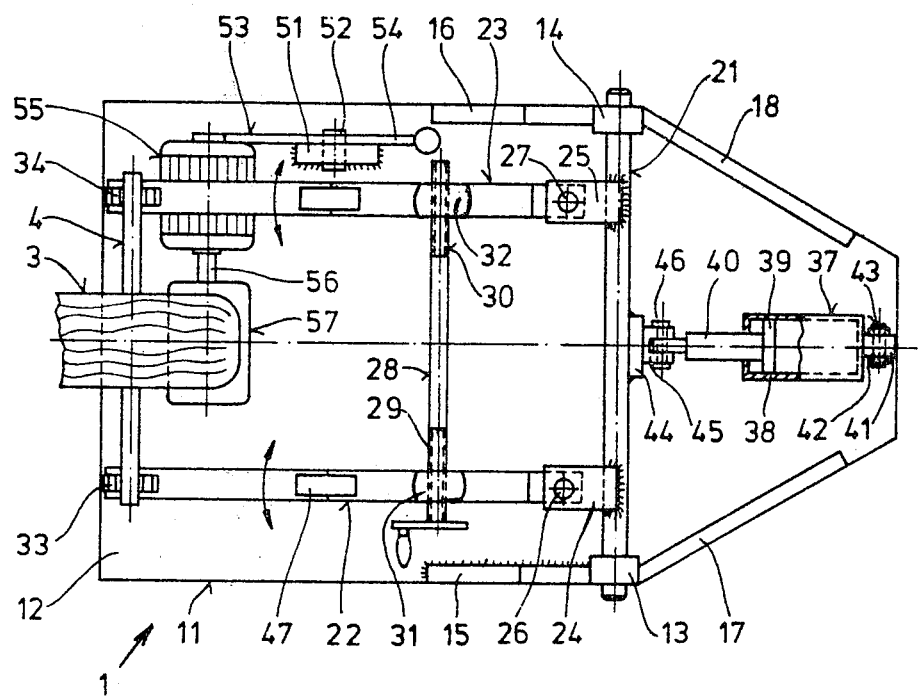
FIG. 2 shows the balancing device according to FIG. 1 in a top view.

The balancing device represented in FIGS. 1 and 2 and generally designated 1, by means of which the front wheel 3 of a motorcycle 2, for example, can be balanced in a short time in a very simple manner, consists substantially of a frame 11, the two supporting arms 22,23 bearing on the frame, which are mounted for vertical adjustment and lateral pivotal movement, as well as a driven friction roller 57, by means of which wheel 3 is rotated. Supporting frame 11 is formed here of a bottom plate 12 and of brackets 13 and 14 projecting from the plate, which bear on bottom plate 12 by means of struts 15,16,17 and 18. In the brackets 13 and 14 is rotatably mounted a carrier shaft 21 on which the supporting arms 22 and 23 are secured.

Forked pieces 24 and 25 are provided for the lateral pivotal holding of supporting arms 22 and 23 which are secured on carrier shaft 21 and in which supporting arms 22 and 23 are held by means of bolts 26,27. In addition, an adjusting spindle 28 is provided which as oppositely directed threads 29 and 30. With these threads 29 and 30 adjusting spindle 28 is screwed into calottes 31 and 32 inserted into supporting arms 22 and 23, so that supporting arms 22 and 23 are turned jointly to the outside or inside about bolts 26, 27 during a rotation of adjusting spindle 28. Spindle 28 thus forms adjustable spacer means for arms 22, 23.

For receiving wheel axle 4 of wheel 3 or the wheel fork, bearing boxes 33 and 34 are provided at the free ends of supporting arms 22 and 23 which rotate about journals 35, 36. Bearing boxes 33 and 34 thus align themselves automatically with wheel axle 4 or the wheel fork.

Naturally bearing boxes 33 and 34 can also be mounted for longitudinal displacement and should be provided with a device for clamping wheel axle 4 or the wheel fork firmly. Instead of adjusting spindle 28 a cable-or chain tackle can also be provided guided over rollers. Furthermore supporting arms 22 and 23 can be locked in predetermined angular positions, e.g. by means of bolts engaging forked pieces 24 and 25.

A servo-mechanism is provided for lifting wheel 3 consisting of a piston 39 inserted into a cylinder 38 and admitted with a pressure medium, whose piston rod 40 is connected with an adjusting lever 44 secured on carrier shaft 21. To this end an eyelet 45 is molded on adjusting lever 44, in which piston rod 44 is held articulated by means of a bolt 46. A flange 41 is arranged on cylinder 37 which is likewise secured by means of a bolt 43 on a holder 42 connected with bottom plate 12. Servo-mechanisms 37 can thus follow the pivotal movement of adjusting lever 44 to act as raising means for the motorcycle.

Friction roller 57, which is arranged on shaft 56 of a driving motor 55, is mounted on a lever 53 which is held in a bracket 51 for rotation about a bolt 52. By actuating lever 53, e.g. by pressing on its handle 54, friction roller 57 can thus be pressed on wheel 3 against the force of a restoring spring 58, so that it is driven by friction roller 57. Drive means for the wheel are thus provided.

In order to determine any unequal distribution of the masses in wheel 3, piezo-elements 61 are provided, which are installed in wheel arm 22, which is subdivided for this purpose, and secured by means of a turnbuckle 47. Corresponding to the broken lines in FIG. 1, piezo-elements 62 can also be inserted in piston rod 40 of servo-mechanism 37 or another part of clamping device 1, which is subject to bracing. The alternating stresses in wheel 3 caused in supporting arms 22, 23 and/or piston rod 24 or adjusting lever 44 during its rotation, are thus absorbed by piezo elements 61 and/or 62 and made visible in indicators (not shown).

For balancing, it is thus only necessary to introduce wheel 3 between the lowered supporting arms 22 and 23, which are lifted by means of servo-mechanism 37, after wheel axle 4 has been inserted into bearing boxes 33 and 34, and to drive the lifted wheel 3 in this state by means of friction rollers 57. Disassembly of wheel 3 is thus no longer necessary and the balancing can be effected in a short time.

I claim:

1. A balancing device for one wheel of a vehicle comprising, a support frame, a pair of support arms pivotally mounted for horizontal and vertical pivoting on said support frame, stress sensing means connected to said support arms for sensing a stress applied thereto, drive means connected to said support frame and adapted to engage a wheel to be balanced for rotating the wheel, raising means connected to the frame and to the pair of support arms for pivoting the pair of support arms vertically, each of the support arms including vehicle engagement ends adapted to engage the vehicle and lift the wheel to be balanced, and adjustable spacer means connected between the pair of support arms for pivoting the arms horizontally to adjust the spacing of their respective vehicle engagement ends.

2. A balancing device according to claim 1, wherein said stress sensing means comprise at least one piezo electric element connected between separate sections of at least one of the support arms.

3. A balancing device according to claim 1, wherein said stress sensing means comprises a piezo electric element connected to said raising means.

4. A balancing device according to claim 1, wherein said adjustable spacer means comprises a spindle shaft threadably received into each of said support arms rotatable in one direction to move said support arms together and in an opposite direction to move said support arms apart.

5. A balancing device for one wheel of a motor cycle comprising, a support frame, a pair of support arms pivotally mounted for horizontal and vertical pivoting on said support frame, at least one of said support arms being divided at an intermediate location along the length of said at least one support arm, a pressure sensing piezo-electric element positioned at the division of said at least one support arm and a connector connected to said at least one support arm at its division, drive means connected to said support frame and adapted to engage a wheel of the motor cycle to be balanced for rotating the wheel, raising means connected to the frame and the pair of support arms for pivoting the pair of support arms vertically, each of the support arms including vehicle engagement ends adapted to engage the vehicle and lift the wheel to be balanced, said piezo-electric element comprising a stress sensor sensing changes in stress on said at least one support arm due to an imbalanced rotation of the wheel.

6. A balancing device according to claim 5, wherein said support frame comprises a bottom plate, a pair of brackets extending from said bottom plate, a carrier shaft connecting said pair of support arms to each other, said carrier shaft pivotally mounted to said pair of brackets.

7. A balancing device according to claim 6, including an adjustment lever extending from said carrier shaft and a servo-actuator connected between said adjustment lever and said frame for moving said adjustment lever and rotating said carrier shaft to move said pair of support arms upwardly and downwardly.

8. A balancing device according to claim 7, including means for locking said supporting arms in a selected position of their horizontal pivoting.

9. A balancing device according to claim 7, including forks extending from said common shaft, said pair of support arms mounted for horizontal pivoting in said forks.

10. A balancing device according to claim 9, including bearing boxes rotatably mounted at a free end of each of said pair of supporting arms, for rotation about a vertical axis for receiving an axle of a wheel to be balanced.

11. A balancing device according to claim 9, wherein said drive means comprises a friction roller, a motor connected to said friction roller for rotating said friction roller, a toggle lever pivotally mounted to said frame and carrying said motor for pivoting into a position to bring said friction roller into engagement with a wheel supported by said supporting arms.

* * * * *